United States Patent
Tracht et al.

(10) Patent No.: US 9,562,125 B2
(45) Date of Patent: Feb. 7, 2017

(54) ACTIVITY MONITORING AND POLYMERIZATION PROCESS CONTROL

(75) Inventors: Ursula Tracht, Leverkusen (DE); Ricarda Leiberich, Neu-Isenburg (DE); Michael Berger, Korschenbroich (DE); Hanns-Ingolf Paul, Leverkusen (DE); Udo Wiesner, Bornheim (DE)

(73) Assignee: ARLANXEO Deutschland GmbH, Dormagen (DE)

( * ) Notice: Subject to any disclaimer, the term of this patent is extended or adjusted under 35 U.S.C. 154(b) by 524 days.

(21) Appl. No.: 13/878,255

(22) PCT Filed: Sep. 23, 2011

(86) PCT No.: PCT/EP2011/066559
§ 371 (c)(1),
(2), (4) Date: Nov. 14, 2013

(87) PCT Pub. No.: WO2012/045597
PCT Pub. Date: Apr. 12, 2012

(65) Prior Publication Data
US 2014/0058050 A1  Feb. 27, 2014

(30) Foreign Application Priority Data
Oct. 8, 2010 (EP) .................................. 10013456

(51) Int. Cl.
| C08F 236/08 | (2006.01) |
| C08F 2/00 | (2006.01) |
| C08F 210/12 | (2006.01) |
| B01J 19/18 | (2006.01) |
| B01J 19/00 | (2006.01) |

(52) U.S. Cl.
CPC .......... *C08F 236/08* (2013.01); *B01J 19/0033* (2013.01); *B01J 19/18* (2013.01); *C08F 210/12* (2013.01); *B01J 2219/00164* (2013.01); *B01J 2219/00186* (2013.01); *B01J 2219/00198* (2013.01); *B01J 2219/00209* (2013.01); *B01J 2219/00231* (2013.01); *C08F 2400/02* (2013.01)

(58) Field of Classification Search
CPC ......... C08F 2/00; C08F 210/12; C08F 236/08; C08F 2400/02; B01J 19/0033; B01J 2219/00164; B01J 2219/00186; B01J 2219/00198
USPC ......................................................... 526/59
See application file for complete search history.

(56) References Cited

U.S. PATENT DOCUMENTS

| 6,072,576 A | 6/2000 | McDonald et al. |
| 6,479,597 B1 * | 11/2002 | Long et al. ............. C08F 10/00 526/59 |
| 2005/0020784 A1 | 1/2005 | Noll |

FOREIGN PATENT DOCUMENTS

| WO | 9829787 A1 | 7/1998 |
| WO | 0077056 A1 | 12/2000 |
| WO | 2004063234 A1 | 7/2004 |

OTHER PUBLICATIONS

Robson F. Storey et al: "Real-Time Monitoring of Carbocationic Polymierization of Isobutylene Using in Situ FTIR-ATR Spectroscopy with Conduit and Diamond-Composite Sensor Technology", Macromolecules, American Chemical Society, Jan. 1, 1998, vol. 31, pp. 1523-1526, XP007917149.
Ardell, G.G., et al: "Model Prediction for Reactor Control", Chemical Engineering Progress, American Institute of Chemical Engineers, vol. 79, No. 6, Jun. 1, 1983, pp. 77-83, XP000600528.
Hidalgo, P. et al: "Nonlinear Model Predictive Control of Styrene Polymerization at Unstable Operating Points", Computers & Chemical Engineering, Pergamon Press, Oxford, Gb, vol. 14, No. 4105, May 1, 1990, pp. 481-494, XP002079798.
Xu, X. et al: Study on cationic polymerization of isobutylene using electrochemical method, European Polymer Journal, Pergamon Press LTD. Oxford, GB, vol. 42, No. 10, Oct. 1, 2006, pp. 2791-2800, XP025170542.
Heublein, G. "Quantitative Description of Polymerization Reactions by Means of Multiparameter Equations", J. Macromol. Sci-Chem, A22 (9), pp. 1277-1298, 1985.

(Continued)

*Primary Examiner* — Fred M Teskin (57) ABSTRACT

The present invention relates to a method to control a liquid feed stream carried out by measuring at least one spectrum of the liquid feed stream comprising an initiator or catalyst, determining its activity using a predictive model on the basis of said spectrum and adjusting the feed streams and/or the preparation conditions of the feed stream comprising the initiators or catalysts in order to attain or maintain a desired level of total activity. In a further aspect the invention relates to a controlled process for the preparation of polymers in a polymerization reactor by contacting liquid feed streams comprising monomers and initiators or catalysts, whereby the control of the feed streams entering the polymerization reactor and/or the initiator or catalyst preparation is carried out by measuring at least one spectrum of the liquid feed stream comprising an initiator or catalyst, determining its activity using a predictive model on the basis of said spectrum and adjusting the feed streams and/or the preparation conditions of the feed stream comprising the initiators or catalysts in order to attain or maintain a desired level of total activity within the polymerization reactor. More particularly, the invention relates to a method for controlling the activity of aluminum containing initiators in a process for the co-polymerization of isolefins and multiolefins, in particular isobutylene and isoprene. The present invention further to device and a chemical plant suitable to operate said process.

18 Claims, 7 Drawing Sheets

(56) References Cited

OTHER PUBLICATIONS

Balogh, L. "Direct monitoring of cationic polymerization by temperature, conductivity and permittivity measurements", Polymer Bulletin 23, pp. 75-82, 1990.

Mateva, R. "Dependence of the Catalytic Activity of Organoaluminum Compounds and Some of Their Complexes on Their Composition", Journal of Polymer Science: Part A-1, vol. 8, pp. 3563-3575, (1970).

European Search Report from co-pending Application EP10013456dated Feb. 11, 2011, 3 pages.

* cited by examiner

ACTIVITY MONITORING AND POLYMERIZATION PROCESS CONTROL

The present invention relates to a method to control a liquid feed stream carried out by measuring at least one spectrum of the liquid feed stream comprising an initiator or catalyst, determining its activity using a predictive model on the basis of said spectrum and adjusting the feed streams and/or the preparation conditions of the feed stream comprising the initiators or catalysts in order to attain or maintain a desired level of total activity. In a further aspect the invention relates to a controlled process for the preparation of polymers in a polymerization reactor by contacting liquid feed streams comprising monomers and initiators or catalysts, whereby the control of the feed streams entering the polymerization reactor and/or the initiator or catalyst preparation is carried out by measuring at least one spectrum of the liquid feed stream comprising an initiator or catalyst, determining its activity using a predictive model on the basis of said spectrum and adjusting the feed streams and/or the preparation conditions of the feed stream comprising the initiators or catalysts in order to attain or maintain a desired level of total activity within the polymerization reactor.

More particularly, the invention relates to a method for controlling the activity of aluminium containing initiators in a process for the co-polymerisation of isolefins and/or multiolefins, in particular for the preparation of butyl rubber from isobutylene and isoprene.

The present invention further relates to a chemical plant suitable to operate said process.

BACKGROUND INFORMATION

Initiator or catalyst systems for polymerizations often exhibit highly variable and poorly controllable or reproducible activity since the typically extremely low concentration of active centers is strongly influenced by preparation conditions and the presence of trace components.

The assessment of a initiator or catalyst systems typically require intense testing since established analytic methods suitable for online monitoring of the activity of initiators or catalysts are currently not available.

Real-time monitoring of monomer consumption and polymer formation for example via ATR-IR or calorimetric measurements is known from Storey, R. F.; Donnalley, A. B.; Maggio, T. L. *Macromolecules* 1998, 31, 1523 and A. Ledwith, E. Lockett, D. C. Sherrington, *Polymer* 1975, 16, 31. However, the contribution and quality of the initiator activity and their distinction from other factors that also may influence polymerization kinetics was not measured.

In X. Xu, Y. Wu, Y. Qiu, C. Dong, G. y. Wu, H. Wang, *Eur. Polym. J.* 2006, 42, 2791 and L. Balogh, L. Fabián, I. Majoros, T. Kelen, *Polym. Bull.* 1990, 23, 75 conductivity measurements have been used to determine ion concentrations and degree of dissociation in initiator solutions.

In G. Heublein, *J. Macromol. Sci.-Chem.* 1985, A22, 1277 and R. Metava, C. Konstantinov, V. Kaibanov, *J. Polym. Sci. Part A, Polym. Chem.* 1970, 8, 3563 attempts are disclosed to link initiator characteristics to catalytic activity.

It is further known from EP 0 948 761 A to control the properties of a halobutyl rubber product by using variable process parameters, in particular Mooney viscosity and polymer molecular weight distribution as process control parameters. The process is performed using an in situ measurement system that does not require the removal of any sample material from the process and which comprises inter alia a Fourier Transform Near Infrared (FTNIR) spectrometer. However, EP 0 948 761 A does not disclose a manufacturing process for polymers which uses the activity of a catalyst or a initiator employed in a polymerization process as process control parameter.

Therefore, there was still a need for a process which allows to determine the activity before using the initiator or catalyst in a continuous or batch polymerization reaction and in particular to control the amount of catalyst or initiator employed in said polymerization process by using the activity as process control parameter.

SUMMARY OF THE INVENTION

There is now provided a controlled process for the preparation of polymers comprising at least the steps of
a) preparing an active first liquid medium comprising at least one polymerisation catalyst or at least one polymerisation initiator
b) contacting in a polymerization reactor
    a volume of a feed stream of said active first liquid medium comprising V1 at least
    one polymerisation catalyst or at least one polymerisation initiator
with
    a volume of a feed stream of a second liquid medium comprising an amount M of at least one polymerizable monomer V2
to form a reaction medium and polymerizing the at least one polymerizable monomer within the reaction medium to form a product medium comprising a polymer,
whereby
    the feed streams V1 and V2 employed in step b) are controlled by at least the steps
    i) measuring at least one spectrum of the active first liquid medium
    ii) determining the specific activity ($a_{specific}$) of the active first liquid medium using a predictive model
    iii) determining a desired volume ratio of the active first liquid medium V1 and the second liquid medium V2 necessary to obtain a desired ratio of total activity $a_{Total}$ (=$a_{specific} \times V1$) and the amount of monomer M contained in V2, said ratio hereinafter being referred to as $R_{desired}$,
    iv) controlling
        the volume V1 of the feed stream of a catalytically active first liquid medium or
        the volume V2 of the feed stream of a second liquid medium comprising an amount M of at least one polymerizable monomer
        or both volumes V1 and V2 of the feed streams
        entering the polymerization reactor in such a manner, that the volume ratio of V1 and V2 at least converges to $R_{desired}$.
    and optionally or alternatively, preferably optionally,
        the preparation conditions of the active first liquid medium
    and optionally or alternatively, preferably optionally,
        the amount of monomer M within the second liquid medium
    and whereby the predictive model was generated by a process comprising at least the steps of
A) measuring spectra for a plurality of active liquid media having different activity
B) determining the specific activity ($a_{specific}$) for said plurality of active liquid media by their employment in a polymerisation reaction with known volumes V1 and V2 and a known amount of the at least one monomer M and analysis of the polymer formed thereby, whereby said polymerisation reaction proceeds substantially via the same mechanism as the polymerisation in step b)

C) correlating the spectra of the active liquid media measured in step A) with their specific activity ($a_{specific}$) determined in step B).

DESCRIPTION OF THE EMBODIMENTS

The scope of the invention encompasses all combinations of process steps, parameters and illustrations set forth above and below, either in general or within areas of preference or preferred embodiments, with one another, i.e., also any combinations between the particular areas and areas of preference.

Feed Streams

In step a) an active first liquid medium comprising at least one polymerisation catalyst or at least one polymerisation initiator is prepared.

As used herein the term "liquid medium" denotes a medium which is substantially liquid at the polymerisation temperature in step b). Substantially liquid means a liquid with a solids content of 10 wt-% or less, preferably 5 wt-% or less and more preferably 2 wt-% or less.

The active liquid media prepared in step a) comprise at least one polymerisation catalyst or at least one polymerisation initiator.

In a preferred embodiment the active liquid media comprise at least one polymerisation initiator or least one polymerisation catalyst and
an organic solvent.

Polymerisation initiators are for example selected from the group of anionic or cationic initiators, whereby the term anionic or cationic initiator denote and include initiators capable of initiating anionic or cationic polymerizations.

Suitable cationic initiators are those producing protons, carbocations or silylium cations capable of initiating cationic polymerizations.

Such cationic initiators include but are not limited to reaction products of
at least one lewis acid such as aluminum trihalides such as aluminium trichloride, titanium halides such as titanium tetrachloride, stannous halides such as stannous tetrachloride, boron halides such as boron trifluoride and boron trichloride, antimony halides such as antimony pentachloride or antimony pentafluoride or at least one organometal compound such as dialkylaluminum halides such as diethylaluminum chloride, alkylaluminum dihalides such as ethylaluminum dichloride or a mixture of the aforementioned lewis acids and/or organometal compounds and at least one proton source such as water, alcohols such as $C_1$ to $C_{12}$ aliphatic alcohols such as methanol, ethanol and isopropanol, phenols, carboxylic acids, sulfonic acids, thiols or inorganic acids such as dihydrogensulfide, hydrogen chloride, hydrogen bromide or sulphuric acid carbocationic compounds of formula (I)

wherein $R^1$, $R^2$ and $R^3$ are independently hydrogen, $C_1$-$C_{20}$-alkyl or $C_5$-$C_{20}$-aryl with the proviso that either one or none of $R^1$, $R^2$ and $R^3$ is hydrogen and $An^-$ denotes a monoanion or 1/p equivalent of a p-valent anion or silylium compounds of formula (II)

wherein $R^1$, $R^2$ and $R^3$ and $An^-$ have the same meaning as set forth above for formula (I)

or mixtures of the aforementioned compounds and reaction products

The preferred molar ratio of lewis acids or organometal compounds and the proton sources is in the range of from 1:0.0001 to 1:5, preferably from 1:0.5 to 1:3 and more preferably from 1:0.5 to 1:2.

In formulae (I) and (II) $R^1$, $R^2$ and $R^3$ are preferably independently selected from the group consisting of phenyl, tolyl, xylyl and biphenyl, methyl, ethyl, n-propyl, n-butyl, n-pentyl, n-hexyl, cyclohexyl, n-octyl, n-nonyl, n-decyl, n-dodecyl, 3-methylpentyl and 3,5,5-trimethylhexyl.

In formulae (I) and (II) $An^-$ preferably denote an anion of formula (III)

wherein

M is boron, aluminum, gallium or indium in the +3 formal oxidation state and $R^4$ is independently, more preferably identically, selected from the group consisting of hydride, dialkylamido, halide such as chloride, $C_1$-$C_{20}$-alkyl or $C_5$-$C_{20}$-aryl, $C_1$-$C_{20}$-haloalkyl or $C_5$-$C_{20}$-haloaryl.

Preferred organic solvents include $C_2$-$C_{20}$ alkanes and $C_1$-$C_{20}$ haloalkanes and mixtures thereof.

Preferred $C_2$-$C_{20}$ alkanes are ethane, propane, n-butane, isobutane, n-pentane, cyclopentane, cyclohexane, n-hexane, methylcyclopentane, 2,2-dimethylbutane, 2,3-dimethylbutane, 2-methylpentane, 3-methylpentane, n-heptane, 2,2-dimethylpentane and n-octane or mixtures thereof.

In another preferred embodiment the organic solvent comprises at least 80 wt.-% of alkanes having a boiling point in the range of 45° C. to 80° C. at a pressure of 1013 hPa, preferably at least 90 wt.-%, even more preferably at least 95 wt.-% and yet even more preferred at least 97 wt.-% the remainder being other compounds which are at least substantially inert under polymerization conditions such as other alkanes or haloalkanes.

Alkanes having a boiling point in the range of 45° C. to 80° C. at a pressure of 1013 hPa include cyclopentane, 2,2-dimethylbutane, 2,3-dimethylbutane, 2-methylpentane, 3-methylpentane, n-hexane, methylcyclopentane and 2,2-dimethylpentane.

In an even preferred embodiment of the invention the organic solvent is substantially free of haloalkanes.

As used herein the term "substantially free" means a content of haloalkanes within the organic solvent of less than 2 wt.-%, preferably less than 1 wt.-%, more preferably less than 0.1 wt.-% and even more preferably absence of haloalkanes.

Generally the active liquid media contain 0.0001 to 20 wt.-%, preferably 0.01 to 10 wt.-% and more preferably 0.05 to 5 wt.-% of compounds of formulae (I) and/or (II) and/or reaction products of at least one lewis acid and/or at least one organometal compound and at least one proton source. In a more preferred embodiment the active liquid medium comprises
 reaction products of
  at least one lewis acid such as aluminum trihalides such as aluminium trichloride, titanium halides such as titanium tetrachloride, stannous halides such as stannous tetrachloride, boron halides such as boron trifluoride and boron trichloride, antimony halides such as antimony pentachloride or antimony pentafluoride or at least one organometal compound such as dialkylaluminum halides such as diethylaluminum chloride, alkylaluminum dihalides such as ethylaluminum dichloride or a mixture of the aforementioned lewis acids and/or organometal compounds and
  at least one proton source such as water, alcohols such as $C_1$ to $C_{12}$ aliphatic alcohols such as methanol, ethanol and isopropanol, phenols, carboxylic acids, sulfonic acids, thiols or inorganic acids such as dihydrogensulfide, hydrogen chloride, hydrogen bromide or sulphuric acid as cationic initiator and
 an organic solvent comprising at least 80 wt.-% of alkanes having a boiling point in the range of 45° C. to 80° C. at a pressure of 1013 hPa, preferably at least 90 wt.-%, even more preferably at least 95 wt.-% and yet even more preferred at least 97 wt.-% the remainder being other compounds which are at least substantially inert under polymerization conditions such as other alkanes.

In an even more preferred embodiment reaction products of diethylaluminum chloride or ethylaluminum dichloride or mixtures thereof with at least one proton source such as water, alcohols such as $C_1$ to $C_{12}$ aliphatic alcohols such as methanol, ethanol and isopropanol, phenols, carboxylic acids, thiols or inorganic acids such as dihydrogensulfide, hydrogen chloride, hydrogen bromide or sulphuric acid is used, whereby water, methanol and hydrogenchloride are even more preferred and water is particularly preferred.

The preferred molar ratio of diethylaluminum chloride or ethylaluminum dichloride or mixtures thereof with such proton sources or preferably water is in the range of from 1:0.01 to 1:3, more preferably from 1:0.5 to 1:2. The aforementioned active liquid medium preferably contains 0.0001 to 20 wt.-%, more preferably 0.01 to 10 wt.-% and even more preferably 0.05 to 5 wt.-% of reaction products of diethylaluminum chloride or ethylaluminum dichloride or mixtures thereof with at least one proton source.

The preparation of the first active liquid media can be effected for example by mixing the catalysts or the initiators with an organic solvent or by at least partially dissolving the catalysts or the initiators in an organic solvent, or reacting precursor materials within the organic solvent to form the active liquid media comprising the initiators or catalysts or, where reaction products of reaction products of lewis acids or organometal compounds and a proton source are employed by reacting the aforementioned compounds within the organic solvent. If required, the concentration of the initiator or catalyst may then be further adjusted by adding or removing further organic solvent.

In step b) a volume V1 of a feed stream of the active liquid media described above is contacted with a volume V2 of a feed stream of a second liquid media comprising an amount M of at least one polymerizable monomer to form a reaction medium. Thereby polymerization typically starts immediately. Preferably, the contacting of the feedstream within the reactor is aided by mixing means such as rotating or static mixers known to those skilled in the art.

As used herein, the term polymerizable monomer encompasses all monomers which can be polymerized in polymerization reactions.

Preferred polymerizable monomers are those of formula (IV):

wherein
$R^5$, $R^6$, $R^7$ and $R^8$ are independently of one another selected from the group consisting of:
 $C_1$-$C_{18}$-alkoxy, $C_1$-$C_{18}$-alkyl, $C_2$-$C_{18}$-alkenyl, $C_2$-$C_{18}$-alkenyl,
 which is either not, once, twice or more than twice interrupted by non-successive functional groups selected from the group consisting of:
  —O—, —CO—, —OCO—, —O(CO)O—, $NR^4$(CO)—, —$NR^9$(CO)O—, —O(CO)$NR^9$, —(CO)$NR^9$—, —$NR^9$(CO)$NR^9$—, —Si($R^{10}$)$_2$—, —OSi($R^{10}$)$_2$O—, —Si($R^{10}$)$_2$O—
 and which is either not, once, twice or more than twice interrupted by bivalent residues selected from the group consisting of $C_3$-$C_{15}$-heterocyclo-diyl and $C_6$-$C_{14}$-aryldiyl,
 and which is not, additionally or alternatively either once, twice or more than twice substituted by substituents selected from the group consisting of:
 halogen, cyano, epoxy, $C_6$-$C_{14}$-aryl; $C_3$-$C_{15}$-heterocyclyl, $C_1$-$C_8$-alkyl, $C_1$-$C_8$-alkoxy, $C_1$-$C_8$-alkylthio, $C_2$-$C_8$-alkenyl, $C_4$-$C_{15}$-arylalkyl, hydroxy, —SO$_2$N($R^9$)$_2$, $NR^4$SO$_2$—$R^{10}$, —N($R^9$)$_2$, —CO$_2$N($R^{10}$)$_2$, —COR$^9$, —OCOR$^9$, —O(CO)OR$^9$, $NR^9$(CO)$R^{10}$, —$NR^9$(CO)OR$^{10}$, O(CO)N($R^9$)$_2$, —$NR^4$(CO)N($R^9$)$_2$, —OSi(OR$^{10}$)$_{y-3}$($R^{10}$)$_y$, —Si(OR$^{10}$)$_{(y-3)}$($R^{10}$)$_y$ where y is 1, 2 or 3.

Examples of preferred polymerizable monomers include:
 $C_4$-$C_{16}$ monoolefins such as isobutene, 2-methyl-1-butene, 3-methyl-1-butene, 2-methyl-2-butene, 4-methyl-1-pentene, styrene, 2-, 3- and 4-methylstyrene, 2-, 3- and 4-bromomethylstyrene, chlorostyrene, p-methoxystyrene, indene, vinyl acetate and isobutyl vinyl ether or mixtures thereof. Preferred $C_4$-$C_{16}$ monoolefins are $C_4$-$C_8$ isoolefins. Most preferred is isobutene.
 conjugated $C_4$-$C_{16}$ multiolefins such as isoprene, butadiene, 2-methylbutadiene, 2-phenyl-1,3-butadiene, 2,4-dimethylbutadiene, 1,3-pentadiene, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene or mixtures thereof. Isoprene is particularly preferred.

non-conjugated $C_4$-$C_{16}$ multiolefins such as divinyl-benzene, norbornadiene, 2-isopropenylnorbornene, 2-vinyl-norbornene, diisopropenylbenzene, divinyltoluene, divinylxylene and $C_1$ to $C_{20}$ alkyl-substituted derivatives of the aforementioned divinylaromatic compounds.

In a preferred embodiment of the invention the second liquid media comprising an amount M of at least one polymerizable monomer comprises a mixture of from 70.0 to 99.5 wt.-% of a $C_4$-$C_{16}$ monoolefin and of from 0.5 to 30.0 wt.-% of a $C_4$-$C_{16}$ monoolefin of at least one conjugated $C_4$-$C_{16}$ multiolefin, whereby the components add up to 100 wt.-% based on the total amount M of at least one polymerizable monomer present in the second liquid media.

More preferably, the second liquid media comprises a mixture of from 92.0 to 99.0 wt.-% of a $C_4$-$C_{16}$ monoolefin and of from 1.0 to 8.0 of a $C_4$-$C_{16}$ monoolefin of at least one conjugated $C_4$-$C_{16}$ multiolefin, whereby the aforementioned components add up to 100 wt.-% based on the total amount M of at least one polymerizable monomer present in the second liquid media.

Even more preferably, the second liquid media comprises a mixture of from 92.0 to 99.0 wt.-% of isobutene and of from 1.0 to 8.0 of isoprene, whereby the aforementioned components add up to 100 wt.-% based on the total amount M of at least one polymerizable monomer present in the second liquid media.

In another embodiment, the second liquid media comprises a mixture of from 90.0 to 98.5 wt.-% of isobutene and of from 1.0 to 8.0 of isoprene and of from 0.5 to 9 wt.-% of a monomer selected from the group consisting of 2-, 3- or 4-methylstyrene, styrene, 2-, 3- or 4-chlorostyrene, p-methoxystyrene, cyclopentadiene, methylcyclopentadiene, indene, whereby the aforementioned components add up to 100 wt.-% based on the total amount M of at least one polymerizable monomer present in the second liquid media.

In still another embodiment, the second liquid media comprises a mixture of from 91.0 to 98.5 wt.-% of isobutene and of from 1.0 to 8.0 of isoprene and of from 0.5 to 3 wt.-% of at least one, preferably one non-conjugated $C_4$-$C_{16}$ multiolefin, whereby the aforementioned components add up to 100 wt.-% based on the total amount M of at least one polymerizable monomer present in the second liquid media.

In step b) the second liquid media comprising an amount M of at least one polymerizable monomer comprises for example of from 0.1 to 100.0 wt.-% of at least one polymerizable monomer, preferably of from 1 to 80.0 wt.-% and more preferably of from 10.0 to 50.0 wt.-%.

In one embodiment the remainder, if any present, is an organic solvent, preferably an organic solvent as described above for the active liquid media.

In a preferred embodiment the remainder, if any present, is the same organic solvent as in the active liquid media.

The preferred reaction temperature in the polymerization reactor depends on the type and concentration of monomers and initiators or catalysts employed in step b). However, for the preparation of polymers using the preferred polymerizable monomers described above the reaction temperature is typically in the range of from −100° C. to 50° C., for the preparation of copolymers comprising at least one $C_4$-$C_{16}$ monoolefin and at least one conjugated or non-conjugated multiolefin the reaction temperature is preferably in the range of from −100° C. to 0° C., for the preparation of copolymers comprising at least isobutene and isoprene the reaction temperature is preferably in the range of from −100° C. to −40° C.

Step b) can be carried out either batchwise or continuously, whereby a continuous process is preferred.

The term polymerization reactor encompasses any device suitable to allow the contacting of the feed streams and therefore can be of any type known to one skilled in the art suitable for that purpose. This includes polymerization reactors disclosed in EP 0053585 A and PCT/EP2010/1059385, whereby the latter is herein incorporated by reference in its entirety.

Process Control

In step b) the volume ratio of V1 and V2 employed in step b) is controlled by at least the steps of
  i) measuring at least one spectrum of the active first liquid medium
  ii) determining the specific activity ($a_{specific}$) of the active first liquid medium using a predictive model
  iii) determining a desired volume ratio of the active first liquid medium V1 and the second liquid medium V2 necessary to obtain a desired ratio of total activity $a_{total}$ (=$a_{specific}$×V1) and the amount of monomer M contained in V2, said ratio hereinafter being referred to as $R_{desired}$, In case of a continuous process $R_{desired}$ denotes a desired volume flow rate ratio of the active first liquid medium V1 and the second liquid medium V2 necessary to obtain a desired ratio of total activity $a_{total}$ (=$a_{specific}$×V1) and the amount of monomer M contained in V2.

In case of a continuous process the volumes V1 and V2 contacted in the polymerization reactor are preferably controlled by adjusting the volume flow rates. Therefore, as used herein, V1 and V2 refer to volume flow rates if continuous processes are meant or disclosed.

In a first step at least one spectrum of the active first liquid medium is measured.

In a preferred embodiment the measurement is at-line or in-line with respect to its spatial arrangement.

In another preferred embodiment the measurement is performed at least once every ten minutes, preferably at least once every 2 minutes.

In another embodiment the measurement is performed online.

Preferably the at least one spectrum is an adsorption, reflection or scattering spectrum whereby NMR spectrum, a Raman spectrum or an infrared (780 nm to 1 mm), ultraviolet (1 nm to 400 nm) or visible (400 nm to 780 nm) absorption spectrum are preferred and whereby an infrared absorption spectrum is more preferred.

In another embodiment more than one type of spectrum may be measured.

Even more preferably, in particular in those cases where initiators are employed, which represent reaction products of lewis acids or organometal compounds with proton sources at least one infrared spectrum is measured covering the MIR (mid-infrared) region of from 400 to 700 cm$^{-1}$ (14.2 μm to 25 μm) which could be identified to be a "fingerprint" region for such kind of initiators by the applicant.

The spectra can be measured using any kind of standard equipment known to those skilled in the art or which is commercially available. The components of said equipment are therefore not discussed in detail.

In a preferred embodiment the spectra are measured using a transmission flow cell. Such transmission flow cells preferably are operated with a path length of 0.1 to 5 mm, even more preferably of from 0.5 to 2 mm. This path length greatly reduces the need to compensate the absorption spectra for changes in the path length compared to conventional methods where the path length is much smaller.

A preferred device for measuring infrared spectra is a fourier-transform-infrared spectrometer (FT-IR) or a fourier-transform-near infrared spectrometer (FT-NIR).

The measured spectra may suffer from variations due to several effects. These effects may be baseline variations e.g. arising from radiation source temperature variations during the measurement, reflectance, scattering or absorption by the cell windows, and changes in the temperature of the detector or overlying spectra caused by ex-sample chemical compounds present during the measurement process such as water vapor and/or carbon dioxide within the spectrometer itself.

Therefore the measured spectra may optionally be corrected by standard methods known to one skilled in the art, e.g. by the method disclosed in EP 948 761 A which is herein incorporated by reference in its entirety.

However, correction of spectra is typically not necessary if one or more isolated absorption bands are used for activity determination.

In a second step the specific activity ($a_{specific}$) of the active first liquid medium is determined using a predictive model.

As used herein the specific activity denotes the activity of the catalyst or the capability of an initiator to catalyze or to initiate the polymerisation reaction per volume unit of the active liquid medium.

In the determination process, the measured, and optionally corrected, spectra are preferably transmitted from the spectrometer to a computer that analyzes the measurements and determines the specific activity ($a_{specific}$) of the active first liquid medium using a predictive model which will be discussed below.

In a third step a volume ratio or, in case of continuous processes, a volume flow rate ratio of the active first liquid medium V1 and the second liquid medium V2 necessary to obtain a desired ratio of total activity $a_{Total}$ ($=a_{specific} \times V1$) and the amount of monomer M contained in V2 ($R_{desired}$) is determined. The amount of monomer M present in the second liquid medium is typically known and in particular for continuous processes held substantially constant to avoid varying reactions conditions due to e.g. varying viscosities or other effects caused by changing monomer concentrations during polymerizations. Substantially constant means that the amount of monomer is preferably held within a range of +−5%, preferably +−2% and even more preferably +−1% of a predefined amount of monomer M present in the second liquid medium.

Additionally the amount of monomer M present in the second liquid medium can be determined by the same spectroscopic methods employed in step b) of the process according to the invention. Particularly preferred is infrared spectroscopy, whereby infrared spectroscopy using a flow-trough cell is even more preferred. The spectra are then in this embodiment additionally used to control the volume feed streams to converge to $R_{desired}$.

If the total activity of the feedstream V1 entering the polymerization reactor is too low to efficiently catalyze or initiate the polymerization of the amount of monomers M present in the second liquid media the conversion of monomers is typically low which afterwards requires either additional steps to recover the monomer and the solvents or, in a worst case scenario, full disposal of the reaction medium.

If the total activity of the feed stream V1 entering the polymerization reactor is too high with respect to the amount of monomers M present in the second liquid medium, the conversion might be quite high. However, the chain length of the polymer and the molecular weight might for example be too low for the intended purpose or deviate from a desired level, which might render the polymer nonmarketable.

Therefore, it is desired to maintain a certain ratio of total activity $a_{Total}$ ($=a_{specific} \times V1$) and the amount of monomer M contained in V2 ($R_{desired}$). This desired ratio typically and preferably lies within a predetermined range which may be the outcome from the experiments to set up the predictive model as described below.

In a fourth step
the volume V1 of the feed stream of a catalytically active first liquid medium or
the volume V2 of the feed stream of a second liquid medium comprising an amount M of at least one polymerizable monomer
or both volumes V1 and V2 of the feed streams
entering the polymerization reactor is controlled in such a manner, that the volume ratio of V1 and V2 at least converges to or preferably is a $R_{desired}$.

If the determination of the third step (iii), which is preferably made using a computer adapted accordingly, reveals that the volume ratio or, in case of continuous processes, the volume flow rate ratio of the active first liquid medium and the second liquid medium deviates from $R_{desired}$ this information can be used as input to a volume or feed stream controller that manipulates the volume or volume flow rate of V1 or V2 or both.

Such a volume or feed stream might be a controllable valve, pump or any other device known to those skilled in the art suitable to control volumes or liquid feed streams.

If for example in a continuous process, the volume flow rate ratio of the active first liquid medium and the second liquid medium is lower than $R_{desired}$ for example either
the volume flow rate of V1 is increased to a value V1* while keeping the flow rate V2 constant or
the volume flow rate of V2 is decreased to a value V2* while keeping the flow rate V1 constant or
the volume flow rates of V1 and V2 are adapted to values V1* and V2*
in such a manner that volume flow rate ratio of the active first liquid medium and the second liquid medium V1*/V2* converges to or preferably is a desired ratio $R_{desired}$.

If for example in a continuous process, the volume flow rate ratio of the active first liquid medium and the second liquid medium is higher than $R_{desired}$ for example either
the volume flow rate of V1 is decreased to a value V1* while keeping the flow rate V2 constant or
the volume flow rate of V2 is increased to a value V2* while keeping the flow rate V1 constant or
the volume flow rates of V1 and V2 are adapted to values V1* and V2*
in such a manner that volume flow rate ratio of the active first liquid medium and the second liquid medium V1*/V2* converges to or preferably is a desired ratio $R_{desired}$.

In addition to that, the term control of the feed streams further encompasses the possibility that if the specific activity of the active liquid medium for whatever reason is particularly low or even zero, that the volumes or volume flow rates V1 or V2 or both are set to zero and the active liquid medium is directly transferred or redirected to a disposal or recovery unit before entering the polymerization rector.

Since this type of control would, in particular for continuous polymerization processes, cause at least a preliminary stop of production, in a further embodiment of the invention the preparation of the first active liquid medium comprises the use of more than one feed stream of active liquid media which are independently of each other prepared and monitored and which are independently controllable as defined above. In this case the spectra measured for the single feed streams of active liquid media would however form a common basis for the control and calculation procedure of the polymerization process.

This embodiment would allow to dispose off or to redirect one or less than the total number of feed streams of active liquid media while still having at least one feed stream of active liquid media entering the polymerization reactor.

Optionally or alternatively, preferably optionally the preparation of the active first liquid medium is controlled.

The preparation of the first active liquid medium can be effected as described above for example by
a) mixing the catalysts or the initiators with an organic solvent or by at least partially dissolving the catalysts or the initiators in an organic solvent, or
b) reacting precursor materials within the organic solvent to form the active liquid medium comprising the initiators or catalysts or,
c) where reaction products of reaction products of lewis acids or organometal compounds and a proton source are employed by reacting the aforementioned compounds within the organic solvent.

If required, the concentration of the initiator or catalyst may then be further adjusted by adding or removing further organic solvent.

The control of preparation may then be effected for example
for a) by changing the ratio of catalysts or the initiators and the organic solvents employed for mixing or dissolving
for b) by changing the ratio of precursor materials which form the catalysts or the initiators and/or the ration of the organic solvents employed for the reaction of the precursor materials
for c) by changing the ratio of the lewis acids and/or organometal compounds and the proton source and/or the ratio of the organic solvents employed for the reaction of the precursor materials
and if required the amount the addition or removal of further organic solvent to adjust the concentration of the initiator or catalyst.

Optionally or alternatively the amount of monomer M within the second liquid media is controlled.

The amount of monomer M can be effected for example by changing the ratio of monomer M and the organic solvent within the second liquid media.

In some cases, however, this embodiment is not a very preferred one, in particular for continuous processes, for the reasons given above.

It is apparent to those skilled in the art that the control may and preferably does consider residence times within communicating lines of the liquid media employed, for example the residence time of the active liquid media in a line from the spectrometer to the polymerization reactor.

Predictive Model

The predictive model which acts as a basis for the determination of the specific activity of the active liquid is generated by a process comprising at least the steps of
A) measuring spectra for a plurality of active liquid media having different activity
B) determining the specific activity ($a_{specific}$) for said plurality of active liquid media by their employment in a polymerisation reaction with known volumes V1 and V2 and a known amounts of monomer M and analysis of the polymer formed thereby, whereby said polymerisation reaction proceeds substantially via the same mechanism as the polymerisation in step b)
C) correlating the spectra of the active liquid media measured in step A) with their specific activity ($a_{specific}$) determined in step B).

In step A) the same methods and spectrometers described above for process step b) can be used. For the predictive model the same features including their areas of preference with respect to measuring spectra apply analogously and preferably identically to the measuring of a plurality of active liquid media having different activity.

As disclosed above the active liquid media may have different activity due to their preparation conditions.

In order to obtain active liquid media having different activity necessary to set up the predictive model their preparation is preferably effected by varying for example one or more of the following parameters:
the ratio of catalysts or the initiators and the organic solvents employed for mixing or dissolving
the solvent or preferably the solvent composition employed
the purity or source of catalysts or the initiators or the solvent employed
varying the temperature during preparation of the active liquid media
the ratio of precursor materials which form the catalysts or the initiators and/or the ratio of the organic solvents employed for the reaction of the precursor materials
the ratio of the lewis acids and/or organometal compounds and the proton source and/or the ratio of the organic solvents employed for the reaction of the precursor materials
if applicable at all, residence or reaction times if the active liquid media are the product of a chemical reaction.

It is apparent and obvious to those skilled in the art that other parameters and conditions may be varied additionally or alternatively depending on the nature of the process to be controlled. This is also encompassed by the scope of the invention.

In a preferred embodiment, and where reaction products of lewis acids and/or organometal compounds and a proton source are used as initiator, at least the ratio of the lewis acids and/or organometal compounds and the proton source is varied.

In step B) the specific activity ($a_{specific}$) for the plurality of active liquid media prepared and measured in step A) is determined by their employment in a polymerisation reaction with known volumes V1 and V2 and a known amounts of Monomer M and analysis of the polymer formed thereby, whereby said polymerisation reaction proceeds substantially via the same mechanism as the polymerisation in step b).

A minimum requirement is that the polymerisation reaction to be used to setup the predictive model proceeds substantially via the same mechanism as the polymerisation to be controlled in process step b).

As used herein substantially via the same mechanism means for example that the specific activity ($a_{specific}$) of the active liquid media needs to be determined for example
in a cationically initiated polymerization if step b) of the polymerization process to be controlled proceeds via a cationic initiation.
in an anionically initiated polymerization if step b) of the polymerization process to be controlled proceeds via an anionic initiation.

in a radically initiated polymerization if step b) of the polymerization process to be controlled proceeds via radical initiation.

The polymerizable monomers to be used to setup the predictive model, even though it is preferred, therefore do not necessarily be the same as the polymerizable monomers used in step b) of the process according to the invention.

The same applies to organic solvents, even though the use of substantially the same solvents is preferred.

Substantially the same solvent as used herein means a solvent or a solvent mixture that is recognized by those skilled in the art to be likewise applicable.

In particular, substantially the same solvents are those falling under the same definition as given above under the paragraph "feedstreams". In particular one particular $C_2$-$C_{20}$ alkane or $C_1$-$C_{20}$ haloalkane is "substantially the same solvent" as another $C_2$-$C_{20}$ alkane or $C_1$-$C_{20}$ haloalkane either replaced alone or within a mixture.

In a preferred embodiment the setup of the predictive model is performed under the same polymerization conditions with respect to temperature ranges, range of solvent composition and range of second liquid media composition and as the polymerization to be controlled using said predictive model.

In order to determine the specific activity ($a_{specific}$) for the plurality of active liquid media the volumes V1 and V2 and a known amounts of Monomer M have to be employed which is preferably done by keeping the relative volumes V1 and V2 and the amounts of Monomer M constant for all experiments used to setup the predictive model.

After the polymerization reaction has been performed or during the polymerization reaction the polymer formed is analysed.

If the analysis is performed after the polymerization reaction this analysis might be based on the total conversion of monomers, total product formation, the molecular weight distribution, the viscosity or any other suitable indicator or parameter known to those skilled in the art to be directly dependent on initiator or catalyst activity.

Said analysis is made applying the techniques common to those skilled in the art.

Total conversion of monomers or total product formation is for example analysed by UV/VIS-, Raman-, IR- or NMR-spectroscopy or in the easiest way by mass balance e.g. by weighing the mass of solids remaining after removal of volatile components such as residual monomers and solvents.

The molecular weight distribution is for example analysed by size exclusion chromatographic (SEC) or gel permeation chromatographic (GPC), In step C) the spectra of the active liquid media measured in step A) are correlated with their specific activity ($a_{specific}$) determined in step B).

It was found that spectra of active liquid media showing high specific activity substantially differ from spectra of active liquid media having a low specific activity.

The correlation according to step C) includes either correlation of the whole spectrum measured for the active liquid media with their specific activity or the correlation of at least one part of the spectrum.

Parts of the spectrum i.e. absorption bands and their intensities, in particular in those cases where absorption spectra are measured, may be assigned to certain characteristic absorptions of particular chemical bonds indicative for either high or low catalytic activity.

In another embodiment it could be shown that more than one, for example two, three or more particular parts of the spectrum serve as suitable indicator for high or low catalytic activity.

It was surprisingly found that there exists a good correlation of a plurality of spectra measured for active liquid media and their specific activity. The results of said correlation are in one embodiment depictable in a two dimensional graph from which the predictive model can be derived e.g. by calculating a best fitting model using for example a linear least squares regression or partial least squares regression. In one embodiment, where more than one particular parts of the spectrum of active liquid media are correlated with their specific activity the predictive model is set up by first calculating an indicator using a weighted set of absorption bands and second calculating a best fitting model for the correlation of said indicator and the specific activity.

In another embodiment the plurality of spectra measured for a plurality of active liquid media is used as an input to a software adapted to generate the predictive model representing the best correlation i.e. the best fitting model, between the spectra measured and the specific activity determined.

Such software is either commercially available or known to those skilled in the art. Examples of such software include Bruker Optics' OPUS software or the GRAMS suite spectroscopy software of Thermo Scientific.

By correlation of the spectra of the active liquid media with their specific activity and preferably by calculating a best fitting function a predictive model can be setup which allows to predict activity of initiators or catalysts based on a spectrum measured for any active liquid medium to be employed in step b) with high certainty.

In an exemplary embodiment the predictive model for the control of a polymerization process to prepare butyl rubber is set up as follows:

A plurality of active liquid media comprising
  reaction products of organometal compounds such as dialkylaluminum halides such as diethylaluminum chloride, alkylaluminum dihalides such as ethylaluminum dichloride or a mixture of the aforementioned organometal compounds
  and
  water as proton source in varying molar ratios of 1:0.1 to 1:10
  and
  an organic solvent comprising at least 80 wt.-% of alkanes having a boiling point in the range of 45° C. to 80° C. at a pressure of 1013 hPa, preferably at least 90 wt.-%, even more preferably at least 95 wt.-% and yet even more preferred at least 97 wt.-% the remainder being other compounds which are at least substantially inert under polymerization conditions such as other alkanes
is prepared and an IR spectrum is measured preferably using a FT-IR spectrometer. Particularly preferably said IR spectrum covers the region of from 400 to 700 cm$^{-1}$ (14.2 µm to 25 µm).

The specific activity of the plurality of active liquid media is determined by polymerizing a second liquid media comprising a mixture of from 92.0 to 99.0 wt.-% of a $C_4$-$C_{16}$ monoolefin and of from 1.0 to 8.0 of a $C_4$-$C_{16}$ monoolefin of at least one conjugated $C_4$-$C_{16}$ multiolefin, whereby the aforementioned components add up to 100 wt.-% based on the total amount M of at least one polymerizable monomer present in the second liquid media.

Said second liquid media comprising an amount M of at least one polymerizable monomer comprises for example of from 0.1 to 100.0 wt.-% of at least one polymerizable monomer, preferably of from 1 to 80.0 wt.-% and more preferably of from 10.0 to 50.0 wt.-%.

The reaction temperature is preferably in the range of from −100° C. to 0° C., for the preparation of copolymers comprising at least isobutene and isoprene the reaction temperature is preferably in the range of from −100° C. to −40° C.

Conversion of monomer and polymer formation is determined by mass balance.

As a result specific activity can be obtained for example as activity of the initiator or catalyst in grams of polymer per gram of active liquid media or any other relation reflecting the specific activity.

The correlation is obtained by univariate or multivariate analyses of the spectra measured for the plurality of active liquid media with different specific activities.

In one embodiment either the maximum absorbance (height) above the baseline or the integrated intensity of the absorbance (area) was taken to correlate the spectra with the specific activity. If an integrated intensity is taken this is typically done by defining a baseline between the starting and end point of the integration and calculating the integrated intensity lying above said simulated base line. Software to automatically perform this step is readily available and those skilled in the art are highly familiar with methods to analyze such kind of absorbances.

Based on the correlation a best fitting model can be generated for example by using the software disclosed above which then serves as predictive model.

The predictive model obtained from the correlation is then used to
- determine the specific activity of an active liquid medium used in the process to prepare polymers under the conditions described above and which were already employed to set up the predictive model and
- to control the feed streams described in the paragraph "process control".

In one embodiment, the spectra measured and the analysis of the polymers formed in the controlled process of preparing polymers are used to additionally refine the predictive model.

Some absorbances have been proven to be particularly useful to set up a predictive model to control a polymerization process. Therefore the invention encompasses further the use of a predictive model based at least on one of the following IR-absorbances:

Al—Cl absorbance, Al-ethyl absorbances and absorbances of Al—O modes in a controlled process for the preparation of polymers, wherein reaction products of dialkylaluminum halides such as diethylalutninum chloride or alkylaluminum di halides such as ethylaluminum dichloride or a mixture of the aforementioned organoaluminium compounds and a proton source are used as polymerization initiator.

Since the method to control the polymerization process was found to be an important aspect, the invention further relates to a method to control the feed streams of a process for the production of polymers comprising the contacting of a feed stream of an active liquid medium comprising an polymerization initiator or catalyst and a second liquid medium comprising an amount M of at least one polymerizable monomer within a polymerization reactor, the process comprising at least the steps of 1) measuring at least one spectrum of an active liquid medium comprising an initiator or catalyst to be employed in the polymerization process 2) determining the specific activity ($a_{specific}$) of the active liquid medium using a predictive model 3) controlling the volume or the volume flow rate of the feed stream of the active liquid medium or of a second liquid medium comprising an amount M of at least one polymerizable monomer and optionally or alternatively, preferably optionally, the preparation conditions of the active first liquid medium or optionally or alternatively, preferably optionally, the amount M of monomer present in the second liquid medium whereby the predictive model was generated by a process comprising at least the steps of A) measuring spectra for a plurality of active liquid media having different activity B) determining the specific activity ($a_{specific}$) for said plurality of active liquid media by their employment in a polymerisation and analysis of the polymer formed thereby, whereby said polymerisation reaction proceeds substantially via the same mechanism as the polymerisation for which the feed stream of the active liquid medium is intended to be used C) correlating the spectra of the active liquid media measured in step A) with their specific activity ($a_{specific}$) determined in step B).

For said method the same explanations, disclosures, statements, parameter including their areas of preference made hereinabove apply accordingly.

The invention is further illustrated by FIGS. 1 to 5 and the examples.

Figure 1:
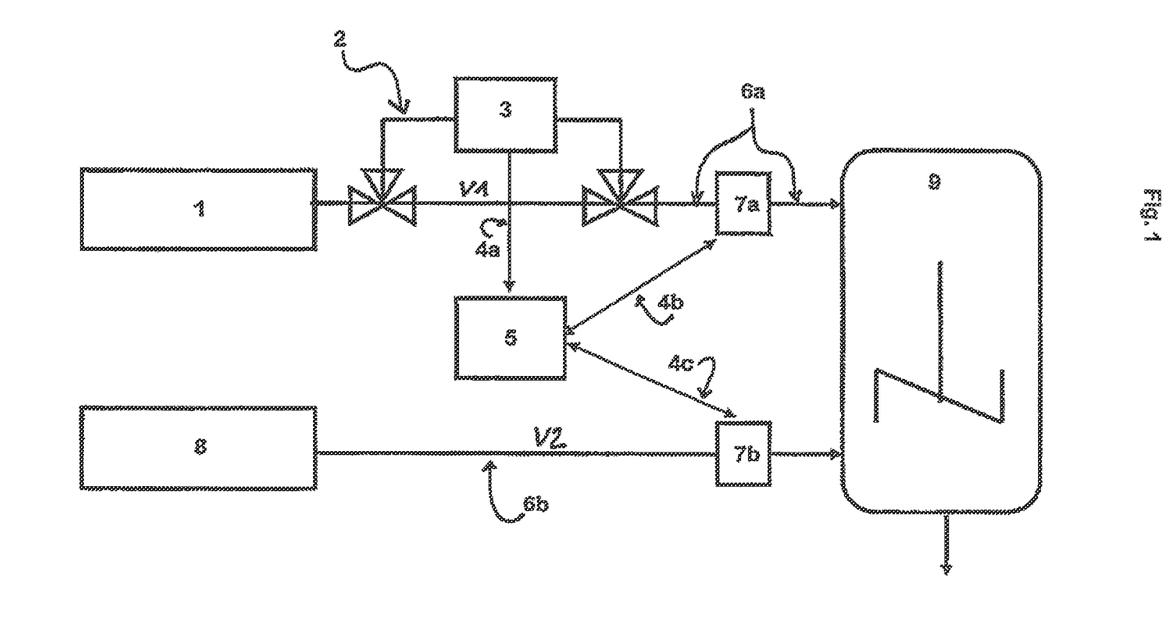
FIG. 1 is a simplified flow diagram of an embodiment of a polymerization section of a chemical plant.

FIG. 1 is a simplified flow diagram of a polymerization section of a chemical plant. The active liquid medium is prepared or stored in a device 1 from which it is transferred via line 6a and feed stream controller 7a as a feed stream V1 to the polymerization reactor 9. The feed stream controller used may be a controllable valve, pump or any other device known to those skilled in the art suitable to control liquid feed streams. Via loop 2, a side stream of the active liquid media is led to an flow through spectrometer 3 and back to line 6a to obtain an at-line measurement. The second liquid medium comprising at least one monomer is prepared or stored in a device 8 from which it is transferred via line 6b and feed stream controller 7b as a feed stream V2 to the polymerization reactor 9. The spectrum measured with flow through spectrometer 3 is transferred via data link 4a to a computer 5 where the predictive model is applied to determine the specific activity of the active liquid medium and to control valves 7a and 7b via data links 4b and 4c in order to converge the ratio of the feed streams V1 and V2 to a desired ratio $R_{desired}$ predefined in computer 5.

Figure 2:
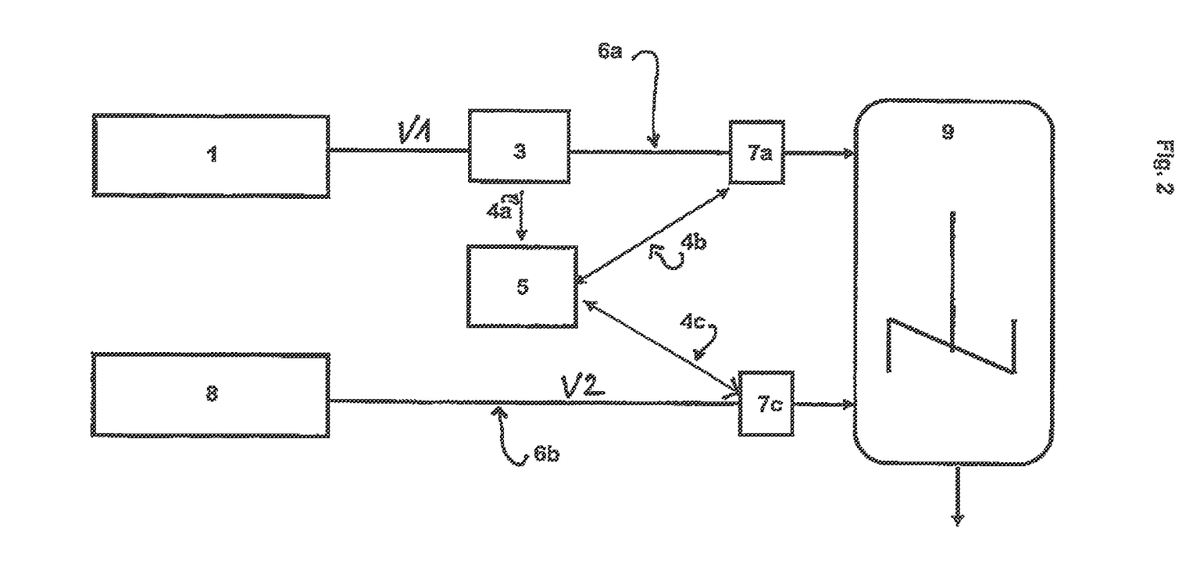
FIG. 2 is a simplified flow diagram of an alternative embodiment of a polymerization section of a chemical plant.

FIG. 2 is similar to FIG. 1 with the difference being that
- the flow through spectrometer 3 is arranged within line 6a to obtain an in-line measurement.
- and line 6b comprises a measurement device 7c measuring the volume flow rate of feed stream V2.

The measured volume flow rate is used as an additional input information for computer 5 via data link 4c and the control occurs only via feed stream controller 7a and data link 4b.

Figure 3:
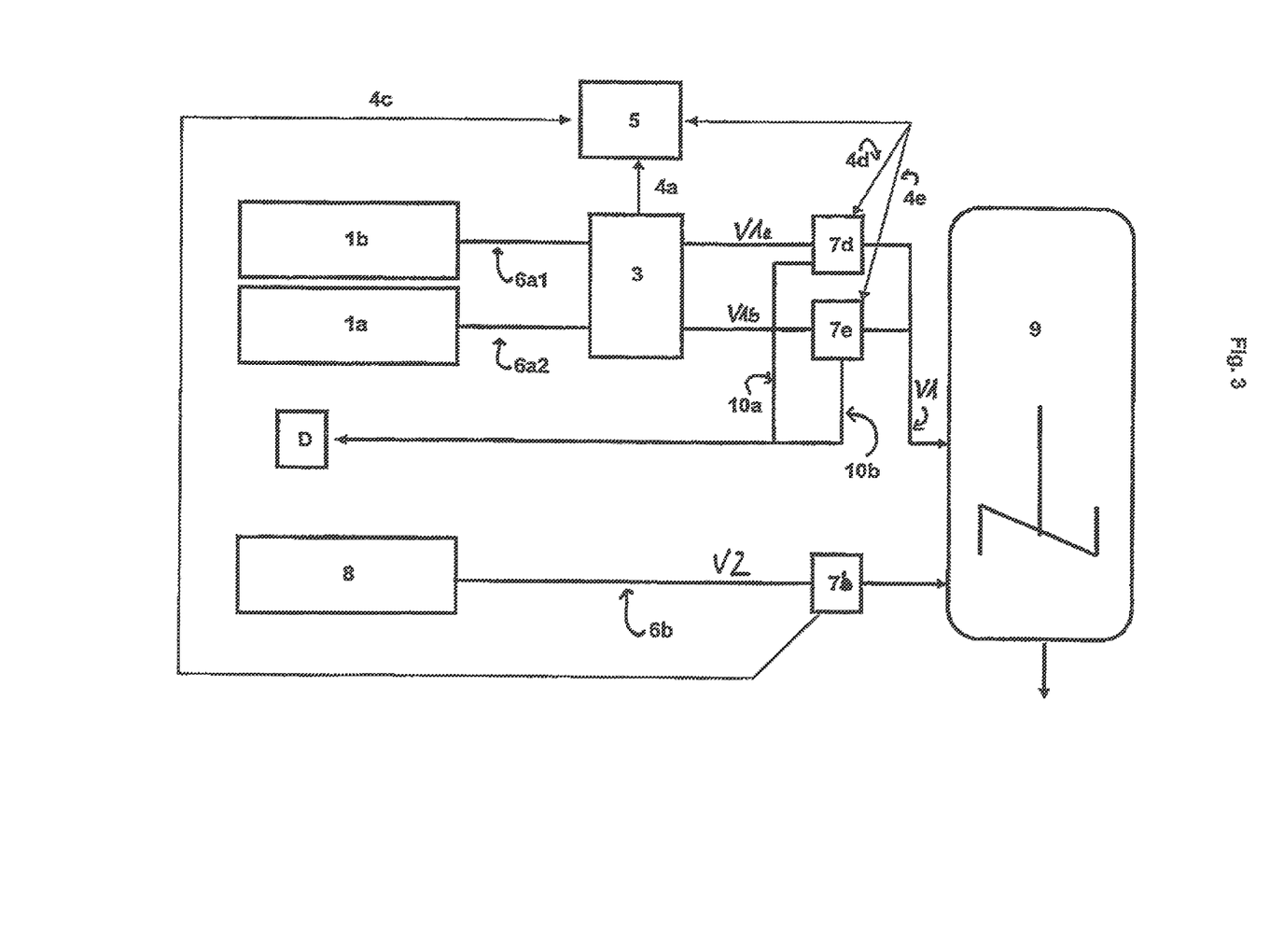
FIG. 3 is a simplified flow diagram of an alternative embodiment of a polymerization section of a chemical plant.

FIG. 3 is a further simplified flow diagram of a polymerization section of a chemical plant. The active liquid media are independently prepared or stored in two devices 1a and 1b from which they are transferred via lines $6a_1$ and $6a_2$ and via two flow through spectrometers 3 and controllable three-way valves 7d and 7e as feed streams V1a and V1b and as combined feed stream V1 to the polymerization reactor 9 or via lines 10a or 10b independently to disposal or recovery unit D. The second liquid medium comprising at least one monomer is prepared or stored in a device 8 from which it is transferred via line 6b and feed stream controller 7b as a feed stream V2 to the polymerization reactor 9. The spectra measured for V1a and V1b are transferred via data link 4a to a computer 5 where the predictive model is applied to determine the specific activity of the active liquid media and to control three-way valves 7d and 7e via data links 4d and 4e in order to converge the ratio of the feed streams V1 and V2 to a desired ratio $R_{desired}$ predefined in computer 5. This may also be done by opening one of the three-way valves 7d and 7e to disposal or recovery unit D in case one of the active liquid media feed streams V1a or V1b shows low or zero specific activity. Measurement device 7b measures the volume flow rate of feed stream V2 which is used as an additional input information for computer 5 via data link 4c.

Figure 4:
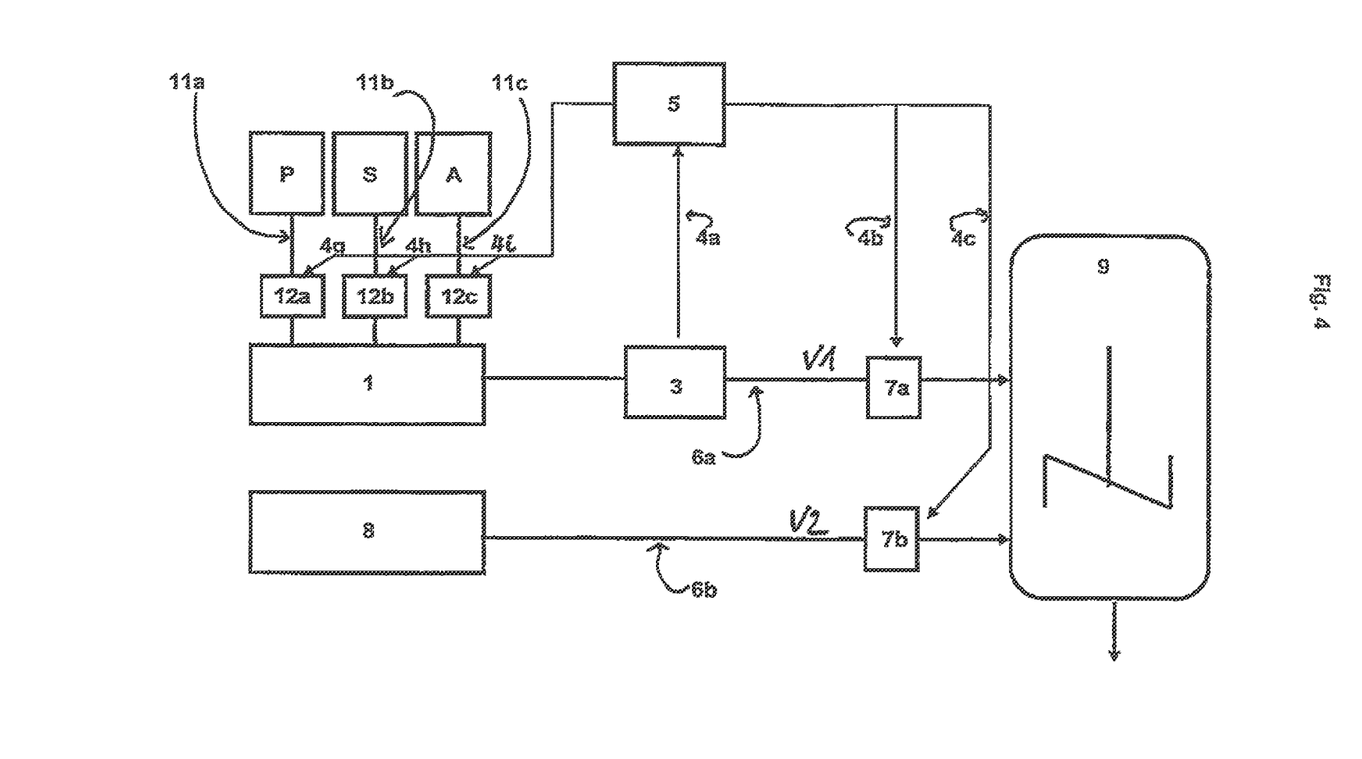
FIG. 4 is a simplified flow diagram of an alternative embodiment of a polymerization section of a chemical plant.

FIG. 4 is a further simplified flow diagram of a polymerization section of a chemical plant. The active liquid medium is prepared in a device 1 which is fed by solvent storage tank S, organometal compound storage tank P and proton source storage tank A via feed stream controller 12a, 12b and 12c.

The active liquid medium is transferred via line 6a, flow-through spectrometer 3 and feed stream controller 7a as a feed stream V1 to the polymerization reactor 9. The second liquid medium comprising at least one monomer is prepared or stored in a device 8 from which it is transferred via line 6b and feed stream controller 7b as a feed stream V2 to the polymerization reactor 9. The spectrum is transferred via data link 4a to a computer 5 where the predictive model is applied to determine the specific activity of the active liquid media and to control either feed stream controller 7a and 7b via data links 4b and 4c to converge the ratio of the feed streams V1 and V2 to a desired ratio $R_{desired}$ predefined in computer 5 and/or feed stream controller 11a, 11b and/or 11c via data links 4g, 4h anti 4i in order to enhance or lower the catalytic activity of active liquid media feed stream V1 prepared in device 1 by changing the ratio of solvent, organometal compound and proton source used to prepare said active liquid media feed stream V1.

Figure 5:
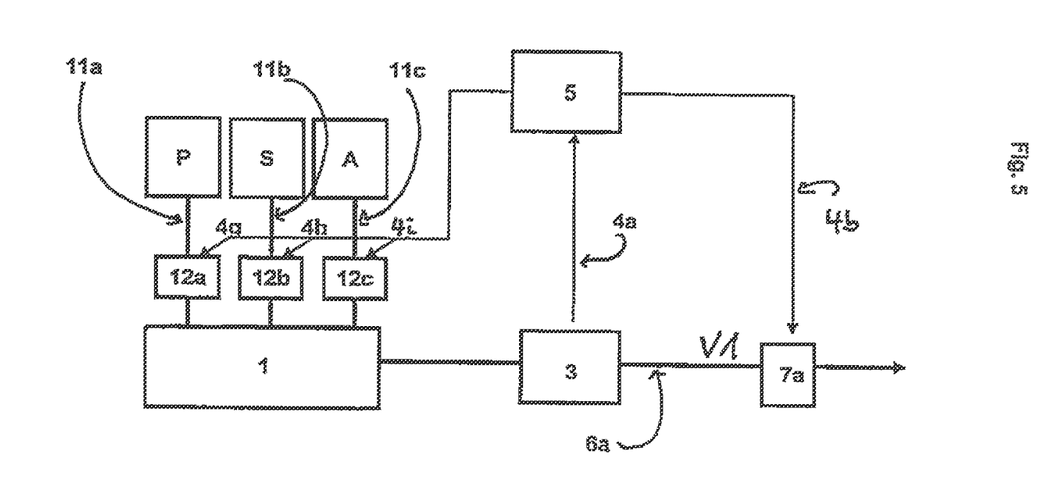
FIG. 5 represents the control system of the embodiment as provided in FIG. 4.

FIG. 5 is an excerpt of FIG. 4 which is intended to describe the method of control. The polymerization sections of a chemical plant described in the figures and hereinabove are particularly useful to carry our the process according to the invention.

Therefore the invention further encompasses a chemical plant comprising at least:
- a line (6a, 6b, 12a, 12b, 12c) equipped with a feed stream controller (7a, 7b, 7d, 7e, 12a, 12b, 12c) which is in communication with
- a polymerization reactor (9) which is in communication with said line
- a device, in particular a flow-through spectrometer (3) arranged to measure a spectrum of a feed stream in a loop (2) bypassing line (6a) or inline of line (6a)
- a computer (5) adapted to:
  applying a predictive model to said spectrum or parts thereof in order to determine the specific activity of said feed stream of an active liquid medium and to controlling the volume or the volume flow rate a feed stream intended to finally enter the polymerization reactor by controlling the feed stream controller (7a, 7b, 7c, 12a, 12b, 12c)
- a data link (4a) connecting said computer (5) with said device (3) to allow data transfer of the device (3) to the computer (5)
- a data link (4b, 4c, 4d, 4e, 4g, 4h, 4i) connecting said computer (5) with a feed stream controller (7a, 7b, 7d, 7e, 12a, 12b, 12c) to allow the control of said feed stream controller by said computer.

The invention is further illustrated by the examples without being limited thereby.

Examples

Continuous Isobutene Isoprene Copolymerization

Materials

Solutions of alkyl aluminum chlorides are used as received (17.5 wt % to 20 wt % solutions in hexane). Hexane (n-hexane or technical grades, different qualities from different providers), isobutene and isoprene are dried by passing through columns filled with molecular sieves, isoprene is additionally submitted to an inhibitor removal step.

I Initiator Preparation

All organoaluminum compounds are handled under inert atmosphere and in closed systems. Transfer between different nitrogen flushed vessels is effected via nitrogen pressure. Precursor solutions are mixed in a ca. 1:1 molar ratio and diluted with commercially available hexane qualities to the target concentration of ca. 1.5 wt %. Water is added to the diluted mixture under vigorous mixing at room temperature. Precipitate is separated before feeding the initiator solution to the polymerization reactors.

II Polymerization

Polymerizations are run in a cooled two vessel cascade equipped with wall-cleaning agitators at temperatures between −60° C. and −80° C. Monomers and hexane are fed to the reactor at a total feed rate of 6 kg/h consisting of ca. 64.6 wt % isobutene, 33.7 wt % hexane and 1.7 wt % isoprene. Initiator feed rates vary between 10 g/h and 70 g/h. Polymer yield is determined gravimetrically.

III Methods

All IR spectra are measured at room temperature on a Biorad FTS 40 PRO spectrometer with DTGS detector using a transmission cell with polyethylene windows. The transmission path length is 1 mm. A flow-through cell is used for on-line measurements. Typical spectra are shown in FIG. 6.

Figure 6:
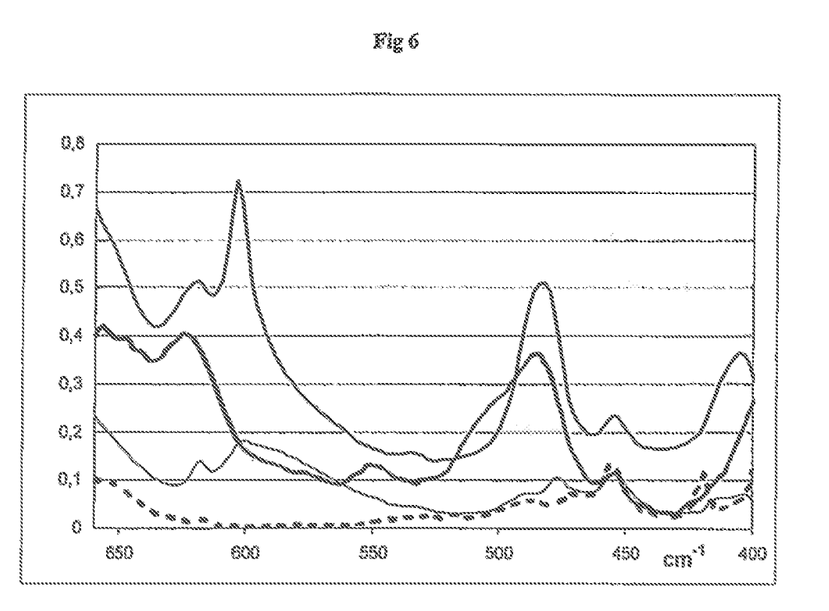
FIG. 6 shows Infra-Red (IR) spectra representative of samples according to an embodiment.

In FIG. 6 the y axis of the graph denotes the absorption and the x axis the wavelength in $cm^{-1}$.

The four spectra show hexane (the solvent employed) in dotted lines, a poor activity catalyst (thin black line), a high activity catalyst (bold black line), and the precursor mixture before adding water (grey line).

For the high activity catalyst (bold black line) the predominant absorptions of Al—Cl (ca 483 $cm^{-1}$), Al-ethyl (ca. 622 $cm^{-1}$) and or to Al—O— modes (ca. 604 $cm^{-1}$) are shown.

Spectra are processed using the software package OPUS 3.1 by Bruker Optik GmbH.

IV Predictive Model Development

To perform step A) of the predictive model setup, during a stationary polymerization run, initiator solution preparation was varied in order to determine the relation between IR spectra and polymerization activity. Three characteristic spectral regions related to Al—Cl modes (detected at ca. 483 $cm^{-1}$), Al-ethyl modes (detected at ca. 622 $cm^{-1}$), and Al-oxygen modes (detected at ca. 602 $cm^{-1}$) show significant changes with changing initiator activity.

A first predictive model was based on simple univariate linear regressions. The height of the Al-oxygen absorbance tracks polymerization activity well. The results are shown in FIG. 7.

Figure 7:
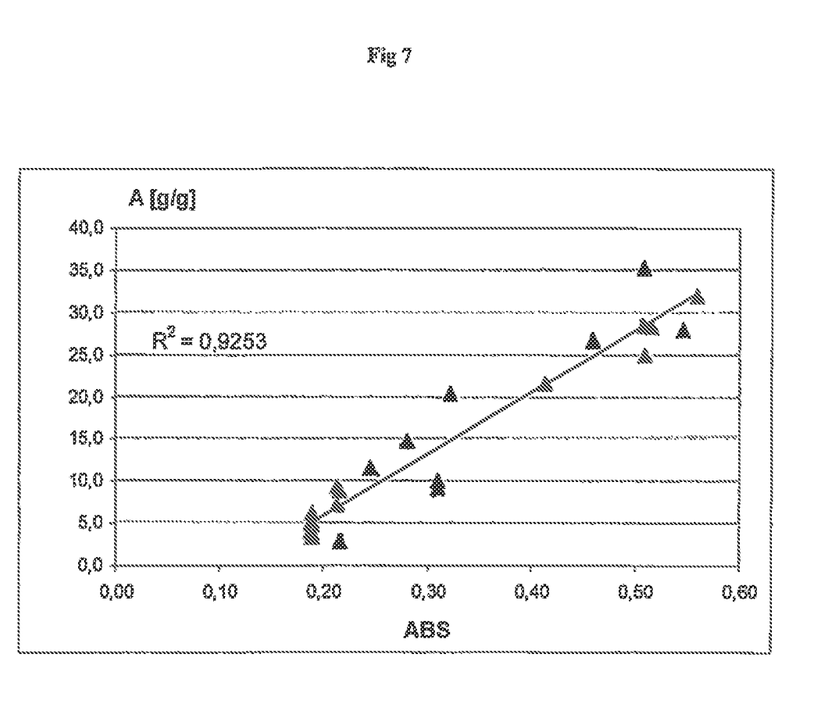
FIG. 7 shows activity as a function of absorbance according to an embodiment.

In FIG. 7, A denotes the specific activity, ABS the IR absorbance (height 602 cm−1)

Even though the calculated values of the integration alone are sufficient to be correlated with the specific activities, in a refined model the spectral region between 430 cm$^{-1}$ and 640 cm$^{-1}$ including the relevant Al—Cl, Al-ethyl and Al-oxygen modes was analyzed based on a large set of measurements from independent polymerizations using the Quant2 method of the OPUS software package of Bruker. The obtained good relation between predicted and measured activities for the full data set is shown in FIG. 8.

Figure 8:
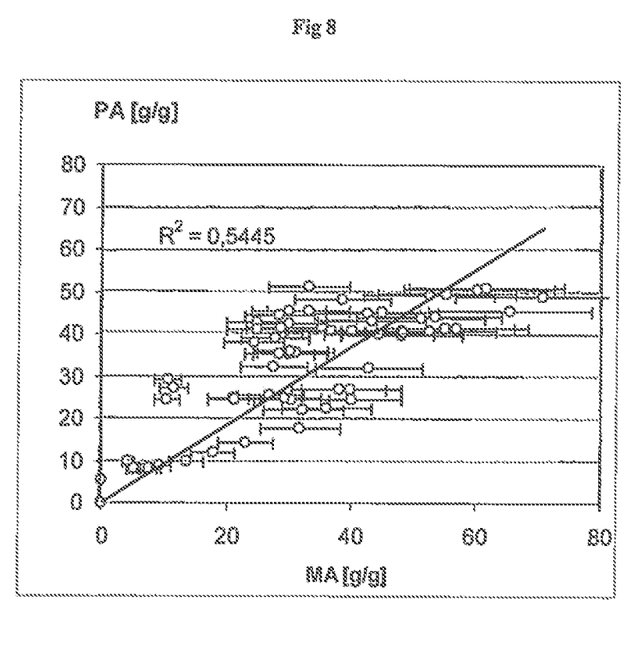
FIG. 8 shows a correlation of predicted activity in relation to measured activity in accordance with an embodiment.

In FIG. 8, PA denotes the predicted specific activity, MA the measured specific activity.

V Application to Process Control

Figure 9:
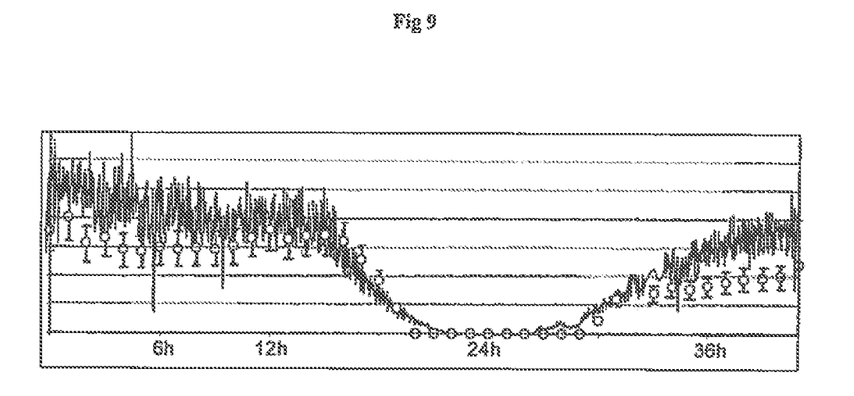
FIG. 9 shows a correlation of predicted activity in relation to measured activity over a designated period of time in accordance with an embodiment.

For a validation of the refined predictive model a single polymerization experiment with variation in initiator quality was performed. The conditions applied were those given in the section "polymerization" hereinabove. Good agreement between predicted and measured activities was achieved. The results are shown in FIG. 9. The refined predictive model was then used to control the continuous polymerization by adjusting the feed stream volume V1 of the active liquid medium applied in the polymerization process. It could be shown that total conversion and activity could be held at a predefined, desired level $R_{desired}$.

The invention claimed is:

1. A controlled process for the preparation of polymers, the process comprising:
  a) preparing an active first liquid medium comprising at least one polymerisation catalyst or at least one polymerisation initiator;
  b) contacting in a polymerization reactor
    a volume of a first feed stream of the active first liquid medium, with
    a volume of a second feed stream of a second liquid medium comprising an amount of at least one polymerizable monomer,
    to form a reaction medium, wherein the at least one polymerizable monomer polymerizes within the reaction medium to form a product medium comprising a polymer, and
  during the contacting, controlling at least one of the first feed stream and the second feed stream by:
    i) measuring at least one spectrum of the active first liquid medium;
    ii) determining the specific activity ($a_{specific}$) of the active first liquid medium using a predictive model;
    iii) determining a desired volume ratio ($R_{desired}$) of the active first liquid medium and the second liquid medium necessary to obtain a desired ratio of total activity $a_{Total}$ (=$a_{specific} \times V1$) and the amount of monomer contained in the second feed stream, wherein V1 is the volume of the first feed stream; and
    iv) controlling
      the volume V1 of the first feed stream, or
      the volume V2 of the second feed stream, or
      both volumes V1 and V2
      entering the polymerization reactor in such a manner, that the volume ratio of V1 and V2 at least converges to $R_{desired}$; and
  whereby the predictive model is generated by a process comprising:
    A) measuring spectra for a plurality of active liquid media having different activity;
    B) determining the specific activity ($a_{specific}$) for the plurality of active liquid media by their employment in a polymerisation reaction with known volumes V1 and V2 and a known amount of the at least one monomer and analysis of the polymer formed thereby, whereby the polymerisation reaction proceeds substantially via the same mechanism as the polymerisation in step b); and
    C) correlating the spectra of the active liquid media measured in step A) with their specific activity ($a_{specific}$) determined in step B).

2. A method to control the feed streams of a process for the production of polymers comprising the contacting of a first feed stream of an active liquid medium comprising a polymerization initiator or catalyst and a second feed stream of a second liquid medium comprising an amount of at least one polymerizable monomer within a polymerization reactor, the method comprising:
  1) measuring at least one spectrum of an active liquid medium comprising an initiator or catalyst to be employed in the polymerization process;
  2) determining the specific activity ($a_{specific}$) of the active liquid medium using a predictive model; and
  3) controlling the volume or the volume flow rate of at least one of the first feed stream and the second feed stream;
  whereby the predictive model is generated by a process comprising:
    A) measuring spectra for a plurality of active liquid media having different activity;
    B) determining the specific activity ($a_{specific}$) for the plurality of active liquid media by their employment in a polymerisation and analysis of the polymer formed thereby, whereby the polymerisation reaction proceeds substantially via the same mechanism as the polymerisation for which the feed stream of the active liquid medium is intended to be used; and
    C) correlating the spectra of the active liquid media measured in step A) with their specific activity ($a_{specific}$) determined in step B).

3. The process according to claim 1 or the method according to claim 2, wherein the active liquid medium comprises the at least one polymerisation initiator or the at least one polymerisation catalyst, and an organic solvent.

4. The process or method according to claim 3, wherein the polymerisation initiator is selected from cationic initiators.

5. The process or method according to claim 4, wherein the cationic initiators are selected from
  reaction products of
    at least one lewis acid or at least one organometal compound or a mixture of lewis adds and organometal compounds, and
    at least one proton source;
  carbocationic compounds of formula (I)

$$[CR^1R^2R^3]^+An^-  \qquad (I)$$

wherein $R^1$, $R^2$ and $R^3$ are independently hydrogen, $C_1$-$C_{20}$-alkyl or $C_5$-$C_{20}$-aryl with the proviso that either one or none of $R^1$, $R^2$ and $R^3$ is hydrogen and $An^-$ denotes a monoanion or 1/p equivalent of a p-valent anion;
  silylium compounds of formula (II)

$$[SiR^1R^2R^3]^+An^-  \qquad (II)$$

wherein $R^1$, $R^2$ and $R^3$ and $An^-$ have the same meaning as set forth above for formula (I); or
  mixtures of the aforementioned compounds and reaction products.

6. The process or method according to claim 3, wherein the organic solvent is selected from $C_2$-$C_{20}$ alkanes and $C_1$-$C_{20}$ haloalkanes and mixtures thereof.

7. The process according to claim 1 or the method according to claim 2, wherein the second liquid media comprises a mixture of 70.0 to 99.5 wt.-% of a $C_4$-$C_{16}$ monoolefin and 0.5 to 30.0 wt.-% of a $C_4$-$C_{16}$ monoolefin of at least one conjugated $C_4$-$C_{16}$ multiolefin.

8. The process according to claim 1 or the method according to claim 2, wherein the second liquid media comprises a mixture of 92.0 to 99.0 wt.-% of a $C_4$-$C_{16}$ monoolefin and 1.0 to 8.0 wt.-% of a $C_4$-$C_{16}$ monoolefin of at least one conjugated $C_4$-$C_{16}$ multiolefin.

9. The process according to claim 1 or the method according to claim 2, wherein the second liquid media comprises a mixture of 90.0 to 98.5 wt.-% of isobutene, 1.0 to 8.0 wt.-% of isoprene, and 0.5 to 9 wt.-% of a monomer selected from the group consisting of 2-, 3- or 4-methylstyrene, styrene, 2-, 3- or 4-chlorostyrene, p-methoxystyrene, cyclopentadiene, methylcyclopentadiene, and indene.

10. The process according to claim 1 or the method according to claim 2, wherein the second liquid media comprises a mixture of 91.0 to 98.5 wt.-% of isobutene, 1.0 to 8.0 wt.-% of isoprene, and 0.5 to 3 wt.-% of at least one non-conjugated $C_4$-$C_{16}$ multiolefin.

11. The process according to claim 1 or the method according to claim 2, wherein the second liquid media comprises 0.1 to 100 wt.-% of at least one polymerizable monomer.

12. The process according to claim 1 wherein step b) is carried out continuously.

13. The process according to claim 1, wherein V1 and V2 are functions of volume flow rates.

14. The process according to claim 1 or the method according to claim 2, wherein the measuring is made at-line or in-line.

15. The process according to claim 1 or the method according to claim 2, wherein the spectrum is an infrared spectrum.

16. The process according to claim 1 or the method according to claim 2, further comprising measuring the spectrum using a fourier-transform-infrared spectrometer (FT-IR).

17. The process according to claim 1 or the method according to claim 2, wherein the control of the at least one feed stream is effected by a valve or pump.

18. The process according to claim 1 or the method according to claim 2, wherein the correlation according to step C) includes either correlation of the whole spectrum measured for the active liquid media with their specific activity or the correlation of at least one part of the spectrum.

* * * * *